United States Patent [19]

Feldman et al.

[11] 4,226,760
[45] Oct. 7, 1980

[54] COLORED RIGID THERMOPLASTIC RESIN COMPOSITIONS AND A PROCESS FOR THEIR PRODUCTION

[75] Inventors: Martin L. Feldman, East Brunswick; James T. DeGroff, Oldwick, both of N.J.

[73] Assignee: Tenneco Chemicals, Inc., Saddle Brook, N.J.

[21] Appl. No.: 37,542

[22] Filed: May 9, 1979

[51] Int. Cl.$^2$ .............................................. C08K 9/04
[52] U.S. Cl. ............................... 260/42.14; 260/40 R; 260/42.56
[58] Field of Search ............... 260/40 R, 42.14, 42.21, 260/42.56; 528/304

[56] References Cited

U.S. PATENT DOCUMENTS

| | | | |
|---|---|---|---|
| 2,987,496 | 6/1961 | Simpson | 260/40 R |
| 3,133,893 | 5/1964 | Newman | 260/42.21 X |
| 3,471,439 | 10/1969 | Bixler et al. | 260/42.14 X |
| 3,785,989 | 1/1974 | Noetzel et al. | 260/40 R X |
| 4,129,549 | 12/1978 | Kohane | 260/42.14 X |

*Primary Examiner*—S. M. Person
*Attorney, Agent, or Firm*—Evelyn Berlow

[57] ABSTRACT

A colored rigid thermoplastic resin composition is prepared by incorporating in a rigid thermoplastic resin composition a non-plasticizing liquid pigment dispersion that contains (a) 5% to 80% by weight of at least one pigment, and
(b) 20% to 95% by weight of an unsaturated polyester vehicle that comprises
  (1) 50% to 100% by weight of an unsaturated polyester that is the product of the reaction of a dicarboxylic acid component that contains 80-90 mole percent of an unsaturated aliphatic dicarboxylic acid having 4 to 8 carbon atoms and 10-20 mole percent of a saturated aromatic dicarboxylic acid and an alcohol component that contains 40-60 mole percent of a glycol having 2 to 6 carbon atoms and 40-60 mole percent of a monohydric alcohol having 6 to 12 carbon atoms, in the amount of 0.4-0.6 mole of the dicarboxylic acid component per mole of the alcohol component, and
  (2) 0 to 50% by weight of an unsaturated monomer capable of reacting with the unsaturated polyester to form cross-linkages.

20 Claims, No Drawings

COLORED RIGID THERMOPLASTIC RESIN COMPOSITIONS AND A PROCESS FOR THEIR PRODUCTION

This invention relates to colored rigid thermoplastic resin compositions and to a process for their production.

Rigid thermoplastic resin compositions have combinations of properties that make them desirable for use by the chemical processing and construction industries in such applications as pipes and pipe fittings, molding, sheeting, building panels, and the like. In many of these applications, it has become important to provide a means for coloring the compositions so as to enhance their appearance. The coloring procedures that have been available to producers of rigid thermoplastic resin compositions in the past have not been satisfactory because they cause contamination problems, because they are expensive, because their use does not result in uniformly-colored products, or because they adversely affect the physical and mechanical properties of the compositions. The use of dry colors, which are pigments treated or coated with dispersing aids such as stearic acid, causes contamination due to dusting and generally does result in products that are not uniformly colored. Solid dispersions, which are pigment concentrates in a resin that is usually the same as the uncolored resin that is to be colored, must be preblended with the uncolored resin or metered into the uncolored resin feedstream in order to reduce the pigment concentration in the finished article to the desired level. In either case, large quantities of resin must be committed for a given color, and color uniformity during lengthy processing runs is often unsatisfactory. In addition, both methods are costly to carry out, the preblend method because it requires an additional processing step, the metering method because it requires the use of expensive metering equipment. Liquid colorant dispersions for thermoplastic resin compositions overcome the aforementioned disadvantages of the dry colors and solid color dispersions. They can be preblended to the desired shade and metered into the uncolored resin as the resin is being produced. Their use results in good color distribution and in the production of articles of uniform color that is substantially free of streaking and specking. In addition, when the colorant is a liquid pigment dispersion, both the colorant and the thermoplastic resin that are being used can be changed quickly and economically.

The liquid pigment dispersions that have been used heretofore to color thermoplastic resin compositions usually contain a surfactant to assist in the dispersion of the pigment in the resin, an organic solvent, and/or a resinous vehicle. The presence of a surfactant or an organic solvent in the liquid pigment vehicle is known to have a deleterious effect on the properties of the colored thermoplastic resin, and the presence of an organic solvent in the dispersion tends to cause pollution problems. The resinous vehicles that have been used previously in pigment dispersions were dicarboxylic acid esters that had a plasticizing effect on the thermoplastic resin. Because of the effects that the surfactant, the organic solvent, and the plasticizing resinous vehicles have on the physical and mechanical properties of the finished products, it has not been possible heretofore to satisfactorily use liquid pigment dispersions in the production of colored rigid thermoplastic resin compositions.

In accordance with this invention, it has been found that rigid thermoplastic resin compositions having strong and uniform coloration can be obtained by incorporating in the resin compositions a liquid dispersion of a pigment in a non-plasticizing polyester vehicle that has a very low viscosity, that has excellent pigment wetting properties, and that is thoroughly compatible with the thermoplastic resin. These liquid pigment dispersions have good flow properties and can be pumped even at high pigment loadings. The incorporation of these liquid pigment dispersions in rigid thermoplastic resin compositions results in colored products that have physical and mechanical properties that are not significantly different from those of the uncolored compositions.

The non-plasticizing liquid pigment dispersions that are used in the production of the colored rigid thermoplastic resin compositions are dispersions of pigments in stable, non-plasticizing, non-thickening vehicles that comprise unsaturated polyesters prepared by the reaction of a dicarboxylic acid component that contains an unsaturated aliphatic dicarboxylic acid and a saturated aromatic dicarboxylic acid and an alcohol component that comprises a glycol and a monohydric alcohol. The unsaturated polyester vehicles do not contain either surfactants or organic solvents that are known to affect adversely the properties of rigid thermoplastic resin compositions.

The unsaturated polyester vehicles of the liquid pigment dispersions are prepared by the reaction of a dicarboxylic acid component with an alcohol component in the amount of 0.4 mole to 0.6 mole of the dicarboxylic acid component per mole of the alcohol component. To be useful in the preparation of the unsaturated polyester vehicles, the dicarboxylic acid component must contain from 80 to 90 mole percent of at least one unsaturated aliphatic dicarboxylic acid having 4 to 8 carbon atoms and 10 to 20 mole percent of at least one saturated aromatic dicarboxylic acid, preferably 83 to 87 mole percent of an unsaturated aliphatic acid and 13 to 17 mole percent of a saturated aromatic acid. Illustrative of the unsaturated aliphatic dicarboxylic acids that can be used in the preparation of the unsaturated polyesters are maleic, fumaric, chloromaleic, ethylmaleic, dimethylmaleic, glutaconic, itaconic, mesaconic, citraconic, and acetylenedicarboxylic acids as well as the anhydrides, acid halides, and lower alkyl esters of these acids. Suitable aromatic acids include phthalic, isophthalic, terephthalic, tetrachlorophthalic, tetrabromophthalic, and dibromotetrahydrophthalic acids and the corresponding anhydrides, acid halides, and lower alkyl esters. The dicarboxylic acid component preferably contains fumaric acid and isophthalic acid.

The alcohol component that is used in the preparation of the unsaturated polyesters contains 40 to 60 mole percent of a glycol having 2 to 6 carbon atoms and 40 to 60 mole percent of a monohydric alcohol having 6 to 12 carbon atoms, preferably equimolar amounts of the mono- and dihydric alcohols. Examples of the glycols that can be used are ethylene glycol, diethylene glycol, propylene glycol, dipropylene glycol, butanediol, hexanediol, neopentyl glycol, and dibromoneopentyl glycol. The monohydric alcohol may be, for example, n-hexanol, 2-methylpentanol-1, 4-methylpentanol-1, 2-ethylbutanol-1, neopentyl carbinol, n-heptanol, n-octanol, 2-ethylhexanol, decanol, or dodecanol. The alcohol component preferably contains ethylene glycol and 2-ethylhexanol.

The unsaturated polyesters are prepared by the conventional method, that is, by reacting the dicarboxylic acid component with the alcohol component at a temperature in the range of 130° C. to 220° C. in the presence of an esterification catalyst, such as p-toluenesulfonic acid or benzenesulfonic acid, and in an atmosphere of inert gas, such as nitrogen or carbon dioxide, until the desired unsaturated polyester is obtained. This unsaturated polyester usually has an acid value of 0.1 to 15, preferably 7 to 10, and a hydroxyl value of 100 to 160, preferably 125 to 135.

While this unsaturated polyester can be used as the sole component of the polyester vehicle in whch the pigment is dispersed, it is preferably used in combination with an unsaturated monomer that is capable of reacting with the polyester through its unsaturated acid component to form cross-linkages. Suitable unsaturated monomers include styrene, methylstyrene, dimethylstyrene, divinylbenzene, vinyltoluene, dichlorostyrene, methyl acrylate, ethyl acrylate, methyl methacrylate, diallyl phthalate, triallyl cyanurate, trimethylolpropane diallyl ether, neopentyl glycol diacrylate, vinyl acetate, acrylonitrile, acrylamide, and mixtures thereof. The relative amounts of the unsaturated polyester resin and the unsaturated monomer in the polyester vehicle may be varied over a wide range. The vehicles generally contain from 5% to 50% by weight of the monomer, with the monomer content preferably in the range of 10% to 20% by weight.

The liquid pigment dispersions that are used to color the rigid thermoplastic resin compositions contain from 5% to 80% by weight, preferably 10% to 70% by weight, of at least one pigment in the unsaturated polyester vehicle. The pigment may be an inorganic pigment such as carbon black, titanium dioxide, iron oxide, aluminum oxide, magnesium oxide, antimony trioxide, cuprous oxides, chromium oxides, cadmium sulfides, cadmium selenides, lead chromate, lead titanate, zirconium oxide, or ultramarine blue, or it may be an organic pigment, such as azo, anthraquinone, benzidine, dianisidine, phthalocyanine, quinacridone, dioxazine, or isoindolinone pigments. In addition, the pigment dispersion may contain an extender pigment, such as clay, calcium carbonate, talc, bentonite, kaolin, mica, silica, barium sulfate, or barium carbonate.

The liquid pigment dispersions are prepared by grinding a mixture of the pigment and unsaturated polyester vehicle in a ball mill, pebble mill, sand mill, dispersion mill, colloid mill, or high shear mixer until a uniform dispersion is obtained. The liquid pigment dispersions prepared in this way are characterized by low viscosity, excellent stability, and compatibility with all types of thermoplastic resins.

Because of the low viscosity and the excellent wettability characteristics of the unsaturated polyester vehicles, the liquid pigment dispersions need not contain the organic solvents or the surfactants that were used in the liquid pigment dispersions of the prior art and that are known to have an adverse effect on the physical and mechanical properties of the rigid thermoplastic resin compositions.

The colored rigid thermoplastic resin compositions of this invention are prepared by incorporating in a rigid thermoplastic resin composition an amount of the liquid pigment dispersion that will provide the desired coloration. The amount of liquid pigment dispersion added is usually that which will provide at least 0.1% by weight of pigment, based on the weight of the composition. In most cases, sufficient pigment dispersion is added to provide from 0.5% to 5% by weight of pigment, based on the weight of the composition. Amounts of the pigment dispersions that will provide 10% or more pigment, based on the weight of the composition, may be used if desired.

As used herein, the term "rigid thermoplastic resin compositions" describes thermoplastic resin compositions that have been formulated to withstand temperatures of at least 175° C. and that are substantially unplasticized. These compositions are characterized by a high degree of resistance to chemical attack, by outstanding solvent resistance, by good resistance to weathering, and by a high strength-to-weight ratio.

Thermoplastic resins suitable for use in the compositions of this invention include polyvinyl chloride; polyvinyl bromide; polyvinylidene chloride; copolymers containing at least 70% of vinyl chloride or vinylidene chloride and up to 30% of a copolymerizable comonomer, such as vinyl acetate, vinyl propionate, ethylene, propylene, methyl acrylate, methyl methacrylate, dialkyl fumarates, dialkyl maleates, and styrene; polyolefins, such as polyethylene, polypropylene, polybutylene, and polystyrene; and blends that contain a major proportion of a vinyl halide homopolymer or copolymer and a minor proportion of another synthetic resin, such as chlorinated polyethylene, polyacrylate resins, polymethacrylate resins, polyacrylonitrile, and terpolymers of acrylonitrile, butadiene, and styrene.

In addition to the aforementioned thermoplastic resin and liquid pigment dispersions, the rigid thermoplastic resin compositions may contain such conventional resin additives as impact modifiers, processing aids, lubricants, and stabilizers in the amounts ordinarily employed for the purposes indicated.

The colored rigid thermoplastic resin compositions may be prepared by any suitable and convenient procedure. For example, the ingredients can be mixed on a heated two-roll mill for a time sufficient to form a homogeneous sheet, which can be removed from the mill in the form of a sheet of the desired thickness which may be used as such or subjected to further treatment. Alternatively, the ingredients can be mixed and then fused in equipment designed to produce either intermediates, such as pelletized compound, or finished shapes, such as sheets, profiles, or pipes.

The invention is further illustrated by the following examples. In these examples, all parts are parts by weight and all percentages are percentages by weight.

EXAMPLE 1

A. A reaction mixture that contained 1.00 mole of ethylene glycol, 1.01 mole of 2-ethylhexanol, 0.91 mole of fumaric acid, 0.15 mole of isophthalic acid, and a catalytic amount of p-toluenesulfonic acid was heated at a temperature in the range of 120° to 200° C. in an atmosphere of nitrogen to form an unsaturated polyester that had an acid number of 1.9, a hydroxyl number of 110, and a viscosity of 229 cps. Subsequently, 86.3 parts of this unsaturated polyester was mixed with 13.7 parts of trimethylolpropane diallyl ether to form an unsaturated polyester vehicle.

B. A series of liquid pigment dispersions was prepared by vigorously agitating various amounts of organic or inorganic pigments and the unsaturated polyester vehicle in a high speed mixer until a uniform dispersion was obtained. The pigments and the amounts of each used are shown in Table I.

TABLE I

Liquid Pigment Dispersions in Unsaturated Polyester Vehicle

| Ex. No. | Pigment | % Pigment in Dispersion |
| --- | --- | --- |
| I-1 | Titanium White | 70.0 |
| I-2 | Cadmium Red, Light | 60.0 |
| I-3 | Molybdate Orange YS | 57.0 |
| I-4 | Yellow Iron Oxide | 45.0 |
| I-5 | Chrome Yellow, Med. | 60.0 |
| I-6 | Chrome Yellow, Light | 65.0 |
| I-7 | Cadmium Yellow, Lemon | 55.0 |
| I-8 | Chrome Yellow, Primrose | 50.0 |
| I-9 | Copper Chrome Black | 60.0 |
| I-10 | Quinacridone Red | 9.9 |
| I-11 | Bon Red | 15.0 |
| I-12 | Organic Orange, Med. | 30.0 |
| I-13 | Phthalo Green | 17.5 |
| I-14 | Milori Blue | 12.0 |
| I-15 | Quinacridone Violet | 12.3 |

C. When each of the liquid pigment dispersions whose preparation is described above was incorporated at the level of 3 PHR into a rigid polyvinyl chloride formulation, a uniformly-colored rigid polyvinyl chloride composition was obtained whose physical and mechanical properties were similar to those of the uncolored polyvinyl chloride composition.

D. When each of the liquid pigment dispersions whose preparation is described above was incorporated into a rigid polyethylene formulation at the level of 2 PHR, the resulting polyethylene composition was uniform in color and free of specks and streaks. The properties of the colored polyethylene composition were not significantly different from those of the uncolored composition.

EXAMPLE 2

A rigid polyvinyl chloride resin composition was prepared by blending together the following materials:

| | Parts by Weight |
| --- | --- |
| Polyvinyl Chloride | 100 |
| Lubricant (Wax XL-355) | 1.25 |
| Acrylic Resin (Tenneco Supercryl 100) | 1.2 |
| Titanium Dioxide | 1.0 |
| Calcium Carbonate | 1.0 |
| Calcium Stearate | 0.35 |
| Dibutyltin mercapto-acetate | 0.40 |

To portions of this composition were added small amounts of the unsaturated polyester vehicle whose preparation is described in Example 1A. The blends were milled for 5 minutes at 350° F. and then removed from the mill rolls as homogeneous sheets. The sheets were evaluated by standard test methods, and the results obtained are given in Table II.

TABLE II

Properties of Polyvinyl Chloride Compositions Containing Unsaturated Polyester Vehicle

| Example No. | A | B | C |
| --- | --- | --- | --- |
| Amount of Polyester Vehicle Added (PHR) | 5 | 3 | 0 |
| Specific Gravity | 1.44 | 1.46 | 1.46 |
| Heat Distortion | 63 | 74 | 73 |
| Izod Impact | 4.37 | 3.96 | 3.01 |
| Flexural Strength | 11,700 | 12,800 | 12,200 |
| Modulus | 467 | 467 | 429 |
| Tensile Strength | 6,300 | 6,700 | 6,200 |
| Modulus | 424 | 425 | 379 |
| Brabender Torque | 1925.5 | 1,501 | 1925.5 |
| Time, Min. | 30 | 30 | 30 |
| Temp. ° C. | 192 | 194 | 190 |

From the data in Table II, it will be seen that the addition of the unsaturated polyester vehicle to the rigid polyvinyl chloride resin composition had little plasticization effect or other effect on the properties of the composition.

EXAMPLE 3

A pigment dispersion that contained 59% of chrome oxide green in the unsaturated polyester vehicle of Example 1A was injected continuously into the throat of a single screw extruder through which the rigid polyvinyl chloride composition described in Example 2 was being run. After a brief preliminary period during which the color was not uniformly distributed throughout the polyvinyl chloride composition, the extruded product had a uniform green color and was free of specks and streaking. The extrusion was continued for more than two hours during which the quality and uniformity of the extruded material were consistently good.

The physical and mechanical properties of the green-colored extruded material were similar to those of the composition to which the liquid pigment dispersion had not been added. The green-colored polyvinyl chloride did not undergo a significant change in appearance or properties during 1000 hours' exposure in a Weatherometer.

What is claimed is:

1. The process for coloring a rigid thermoplastic resin composition that comprises incorporating in said composition an amount of a non-plasticizing liquid pigment dispersion that will provide at least 0.1% by weight of pigment, based on the weight of the composition, said non-plasticizing liquid pigment dispersion containing
   (a) 5% to 80% by weight of at least one pigment and
   (b) 20% to 95% by weight of an unsaturated polyester vehicle that comprises
      (1) 50% to 100% by weight of an unsaturated polyester that is the product of the reaction of a dicarboxylic acid component containing 80 to 90 mole percent of at least one unsaturated aliphatic dicarboxylic acid having 4 to 8 carbon atoms and 10 to 20 mole percent of at least one saturated aromatic dicarboxylic acid with an alcohol component containing 40 to 60 mole percent of a glycol having 2 to 6 carbon atoms and 40 to 60 mole percent of a monohydric alcohol having 6 to 12 carbon atoms, in the amount of 0.4 mole to 0.6 mole of the dicarboxylic acid component per mole of the alcohol component, and
      (2) 0 to 50% by weight of an unsaturated monomer capable of reacting with said unsaturated polyester to form cross-linkages.

2. The process of claim 1 wherein the amount of the non-plasticizing liquid pigment dispersion that is incorporated in the rigid thermoplastic resin composition is that which will provide 0.5% to 5% by weight of pigment, based on the weight of the composition.

3. The process of claim 1 wherein the non-plasticizing liquid pigment dispersion contains 10% to 70% by weight of at least one pigment.

4. The process of claim 1 wherein the unsaturated polyester vehicle contains 80% to 90% by weight of said unsaturated polyester and 10% to 20% by weight of said unsaturated monomer.

5. The process of claim 1 wherein the dicarboxylic acid component of the unsaturated polyester contains 83 to 87 mole percent of said unsaturated aliphatic dicarboxylic acid and 13 to 17 mole percent of said aromatic acid.

6. The process of claim 1 wherein the dicarboxylic acid component of the unsaturated polyester consists essentially of fumaric acid and isophthalic acid.

7. The process of claim 1 wherein the alcohol component of the unsaturated polyester contains equimolar amounts of the glycol and the monohydric alcohol.

8. The process of claim 1 wherein the alcohol component of the unsaturated polyester consists essentially of ethylene glycol and 2-ethylhexanol.

9. The process of claim 1 wherein the thermoplastic resin is polyvinyl chloride.

10. The process of claim 1 wherein the thermoplastic resin is polyethylene.

11. The colored rigid thermoplastic resin composition that is prepared by incorporating in a rigid thermoplastic resin composition an amount of a non-plasticizing liquid pigment dispersion that will provide at least 0.1% by weight of pigment, based on the weight of the composition, said non-plasticizing liquid pigment dispersion containing
   (a) 5% to 80% by weight of at least one pigment and
   (b) 20% to 95% by weight of an unsaturated polyester vehicle that comprises
      (1) 50% to 100% by weight of an unsaturated polyester that is the product of the reaction of a dicarboxylic acid component containing 80 to 90 mole percent of at least one unsaturated aliphatic dicarboxylic acid having 4 to 8 carbon atoms and 10 to 20 mole percent of at least one saturated aromatic dicarboxylic acid with an alcohol component containing 40 to 60 mole percent of a glycol having 2 to 6 carbon atoms and 40 to 60 mole percent of a monohydric alcohol having 6 to 12 carbon atoms, in the amount of 0.4 mole to 0.6 mole of the dicarboxylic acid component per mole of the alcohol component, and
      (2) 0 to 50% by weight of an unsaturated monomer capable of reacting with said unsaturated polyester to form cross-linkages.

12. The colored rigid thermoplastic resin composition of claim 11 wherein the amount of the non-plasticizing liquid pigment dispersion that is incorporated in the composition is that which will provide 0.5% to 5% by weight of pigment, based on the weight of the composition.

13. The colored rigid thermoplastic resin composition of claim 11 wherein the non-plasticizing liquid pigment dispersion that is incorporated in the composition contains 10% to 70% by weight of at least one pigment.

14. The colored rigid thermoplastic resin composition of claim 11 wherein the unsaturated polyester vehicle of the pigment dispersion contains 80% to 90% by weight of an unsaturated polyester and 10% to 20% by weight of said unsaturated monomer.

15. The colored rigid thermoplastic resin composition of claim 11 wherein the dicarboxylic acid component of the unsaturated polyester contains 83 to 87 mole percent of said unsaturated aliphatic acid and 13 to 17 mole percent of said aromatic acid.

16. The colored rigid thermoplastic resin composition of claim 11 wherein the dicarboxylic acid component of the unsaturated polyester consists essentially of fumaric acid and isophthalic acid.

17. The colored rigid thermoplastic resin composition of claim 11 wherein the alcohol component of the unsaturated polyester contains equimolar amounts of the glycol and the monohydric alcohol.

18. The colored rigid thermoplastic resin composition of claim 11 wherein the alcohol component of the unsaturated polyester consists essentially of ethylene glycol and 2-ethylhexanol.

19. The colored rigid thermoplastic resin composition of claim 11 wherein the thermoplastic resin is polyvinyl chloride.

20. The colored rigid thermoplastic resin composition of claim 11 wherein the thermoplastic resin is polyethylene.

* * * * *